United States Patent
Gao et al.

(10) Patent No.: US 12,551,854 B2
(45) Date of Patent: Feb. 17, 2026

(54) MEMBRANE SUPPORTING STRUCTURES

(71) Applicant: Memzyme, LLC, Albuquerque, NM (US)

(72) Inventors: Yongqian Gao, Albuquerque, NM (US); Rong-An Chiang, Albuquerque, NM (US); Christopher P. Beamis, Mukilteo, WA (US)

(73) Assignee: Memzyme, LLC, Albuquerque, NM (US)

( * ) Notice: Subject to any disclaimer, the term of this patent is extended or adjusted under 35 U.S.C. 154(b) by 339 days.

(21) Appl. No.: 18/310,398

(22) Filed: May 1, 2023

(65) Prior Publication Data

US 2024/0367113 A1 Nov. 7, 2024

(51) Int. Cl.
*B01D 53/22* (2006.01)
*B01D 69/10* (2006.01)

(52) U.S. Cl.
CPC .......... *B01D 69/105* (2013.01); *B01D 53/22* (2013.01); *B01D 69/108* (2022.08); *B01D 2257/504* (2013.01); *B01D 2258/0233* (2013.01); *B01D 2258/06* (2013.01)

(58) Field of Classification Search
CPC .... B01D 69/105; B01D 69/108; B01D 53/22; B01D 2257/504; B01D 2258/0233; B01D 2258/06
See application file for complete search history.

(56) References Cited

U.S. PATENT DOCUMENTS

| | | | | |
|---|---|---|---|---|
| 4,608,060 A | * | 8/1986 | Kulprathipanja | B01D 69/12 95/47 |
| 5,178,649 A | * | 1/1993 | Summers | C08G 65/4006 95/55 |
| 5,281,254 A | * | 1/1994 | Birbara | B01D 53/1493 96/5 |
| 8,167,976 B2 | * | 5/2012 | Del Paggio | B01D 71/022 95/55 |
| 2010/0305289 A1 | * | 12/2010 | Jiang | B01D 67/0079 526/279 |
| 2011/0052466 A1 | * | 3/2011 | Liu | B01D 69/106 423/230 |
| 2011/0284456 A1 | * | 11/2011 | Brozell | B01D 69/106 427/244 |
| 2012/0183835 A1 | * | 7/2012 | Young | H01M 10/345 429/304 |
| 2013/0146521 A1 | * | 6/2013 | Brozell | B01D 67/0088 210/500.21 |

(Continued)

*Primary Examiner* — Anthony R Shumate
(74) *Attorney, Agent, or Firm* — Scale LLP

(57) ABSTRACT

Methods of preparing a porous robust support to host an ultra-thin enzyme-assisted membrane, and a new membrane system that can be used for gas filtration purposes to remove/separate carbon dioxide or other gases from a gas mixture such as those from power production or enhanced oil recovery or fuel production or air and recycle/collect/utilize carbon dioxide are disclosed herein. A method may include protecting the surface with a blocking material and polishing the protected surface, coating a thin layer of silica nanospheres onto the polished surface, coating a silica sol-gel and surfactant solution onto the nanospheres, and then removing the surfactant and blocking material to generate a well-defined porous structure with nanochannels.

15 Claims, 4 Drawing Sheets

(56) References Cited

U.S. PATENT DOCUMENTS

| | | | |
|---|---|---|---|
| 2015/0190792 A1* | 7/2015 | Muraza | C01B 39/46 423/702 |
| 2016/0015652 A1* | 1/2016 | John | B82Y 30/00 502/262 |
| 2016/0184770 A1* | 6/2016 | Kulkarni | C10L 3/103 95/49 |
| 2022/0178036 A1* | 6/2022 | Campbell | C25B 1/23 |

* cited by examiner

MEMBRANE SUPPORTING STRUCTURES

BACKGROUND

Field of the Invention

The present disclosure relates generally to selectively permeable membranes and, more particularly, to robust and selectively permeable membranes configured to use catalysis to accelerate the selective permeation process.

Description of the Related Art

Membranes are widely employed in gas filtration, liquid filtration, catalysis, and distillation applications. For example, membrane-based techniques are the most promising techniques for the capture and filtration of carbon dioxide ($CO_2$) from power plants. To meet the challenges of increasing $CO_2$ supplies for industrial use and re-use while also reducing greenhouse gas emissions, various approaches have been developed or proposed to separate and capture $CO_2$.

Researchers have spent decades trying to develop membranes for gas separation applications that demonstrate both high selectivity and high flux to satisfy the requirements of industrial gas separation applications. Commercial gas separation membranes consist mainly of polymeric materials. Such membranes have shown chemical resistance and stability, but lack the combination of high selectivity and high flux required for efficient separations. Also, such polymer-based materials are not as durable as inorganic membranes.

Another potential approach to gas separation employs enzymes in aqueous solution to catalyze the conversion of $CO_2$ to a water-soluble form to facilitate the uptake of $CO_2$ into solution, and then further catalyze the conversion of soluble $CO_2$ into the gas phase and thereby facilitate the release of $CO_2$. Neither enzymes in aqueous solution alone nor polymeric membranes, with or without enzymes, are feasible for gas separation because of their high cost, lack of high selectivity combined with high flux, and lack of durability.

$CO_2$ capture may be cost-effectively performed using an enzyme-laden water droplet in an ultrathin nanopore of an anodized alumina substrate. There is a need, however, for an improved membrane support to provide effective use of this system for industrial applications.

SUMMARY

The present disclosure relates to porous membranes suitable for use in separating $CO_2$ from gases or liquids, and methods of preparing and using the same.

In some embodiments, membrane supports that are effective for enzyme-catalyzed $CO_2$ separation are described. In some embodiments, methods of making said membrane supports are described. In some embodiments, methods of using said membrane supports are described.

In some embodiments, a method of fabricating a porous support for membranes that is suitable for capturing gases or liquids is described. The method includes the following steps in order: (1) providing a porous support composed of a first material that has an outer surface and an inner surface, (2) optionally coating the outer surface of the porous support with a second material to generate a coated outer surface, (3) polishing the outer surface or the coated outer surface, (4) coating a layer of ceramic nanospheres on the outer surface of the porous support, (5) coating a layer of sol-gel solution onto the ceramic nanosphere layer that is coated on the outer surface of the porous support, where the sol-gel solution includes a surfactant, and (6) removing at least the surfactant from the sol-gel layer on the porous support to generate nanopores, thereby forming a nanoporous layer on top of the porous support. In some embodiments, the method may further include an additional polishing step between steps (1) and (2). The size of the nanopores may be based, at least in part, on a molecular dimension of the surfactant.

A porous support for membranes that are suitable for capturing gases or liquids that is fabricated using the method described above is also disclosed herein.

A porous support for membranes that are suitable for capturing gases or liquids that includes: (1) a substrate with a sub-micron-sized porous structure composed of a first material, where the substrate has an inner surface and an outer surface, the outer surface is optionally coated with a second material, and the outer surface, optionally coated with the second material, is polished to a sub-micron smoothness, (2) a coating of a ceramic nanosphere layer on the substrate, and (3) a coating on the ceramic nanosphere layer that is formed by exposing the ceramic nanosphere layer to a silica sol-gel solution and then forming a self-assembled nanoporous structure on the ceramic nanosphere layer is also disclosed herein.

BRIEF DESCRIPTION OF THE DRAWINGS

The accompanying drawings, which are incorporated in and constitute a part of this specification, illustrate embodiments of the present disclosure, and, together with the description, explain the principles of the disclosure.

DETAILED DESCRIPTION

The present disclosure relates to porous membranes suitable for use in separating $CO_2$ from gases or liquids, and methods of preparing and using the same.

In some embodiments, membrane supports that are effective for enzyme-catalyzed $CO_2$ separation are described. In some embodiments, methods of making said membrane supports are described. In some embodiments, methods of using said membrane supports are described.

In some embodiments, a method of fabricating a porous support for membranes that is suitable for capturing gases or liquids is described. The method includes the following steps in order: (1) providing a porous support composed of a first material that has an outer surface and an inner surface, (2) optionally coating the outer surface of the porous support with a second material to generate a coated outer surface, (3) polishing the outer surface or the coated outer surface, (4) coating a layer of ceramic nanospheres on the outer surface of the porous support, (5) coating a layer of sol-gel solution onto the ceramic nanosphere layer that is coated on the outer surface of the porous support, where the sol-gel solution includes a surfactant, and (6) removing at least the surfactant from the sol-gel layer on the porous support to generate nanopores, thereby forming a nanoporous layer on top of the porous support. In some embodiments, the method may further include an additional polishing step between steps (1) and (2). The size of the nanopores may be based, at least in part, on a molecular dimension of the surfactant.

A porous support for membranes that are suitable for capturing gases or liquids that is fabricated using the method described above is also disclosed herein.

A porous support for membranes that are suitable for capturing gases or liquids that includes: (1) a substrate with a sub-micron-sized porous structure composed of a first material, where the substrate has an inner surface and an outer surface, the outer surface is optionally coated with a second material, and the outer surface, optionally coated with the second material, is polished to a sub-micron smoothness, (2) a coating of a ceramic nanosphere layer on the substrate, and (3) a coating on the ceramic nanosphere layer that is formed by exposing the ceramic nanosphere layer to a silica sol-gel solution and then forming a self-assembled nanoporous structure on the ceramic nanosphere layer is also disclosed herein.

Figure 1:
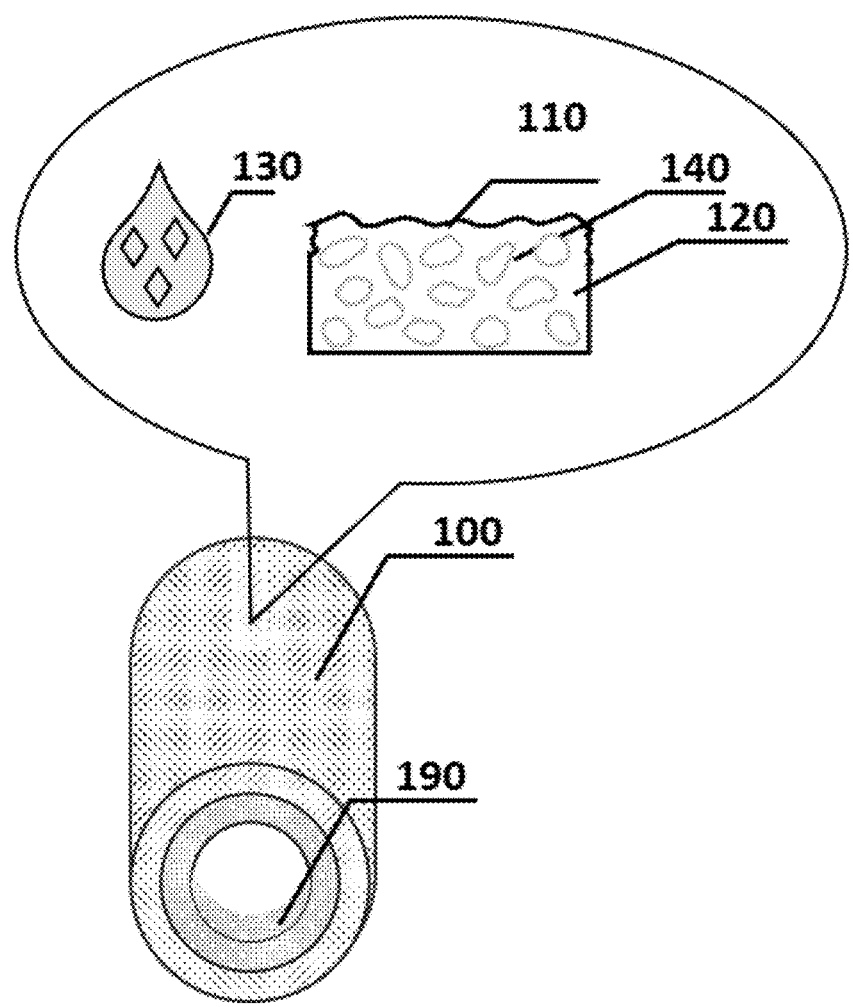
FIG. 1 shows a schematic illustration of an embodiment of a tubular porous membrane support and a schematic illustration of a first step for preparing a porous ceramic substrate where the surface of the tubular porous membrane support is polished.

FIG. 1 shows a schematic illustration of an embodiment of a tubular porous membrane support and a schematic illustration of a first step for preparing a porous ceramic substrate where the surface of the tubular porous membrane support is polished. A bare tubular substrate with a sub-micron-sized porous structure may be polished to reduce the roughness of the surface of the substrate. Prior to polishing, a blocking material such as a polymer or small molecule may be applied to the surface of the substrate to fill in pores in the substrate so as to prevent damage to the surface during polishing.

The embodiment of a tubular porous membrane support shown in FIG. 1 is composed of an outer surface 100 and an inner surface 190, having pores 140 that may have various sizes and shapes. In alternate embodiments, the substrate may be planar instead of tubular, as desirable for the specific application. In the illustrated embodiment, a tubular ceramic substrate, such as alumina (e.g., $\alpha$-$Al_2O_3$, $\gamma$-$Al_2O_3$, $\alpha$-$Al_2O_3$ layered onto $\gamma$-$Al_2O_3$), may be used. In some embodiments, the tubular ceramic substrate may have a 0.5" inner diameter and a 2 mm thickness. The outer surface 100 of the porous membrane support may have a smaller or similar pore diameter as the inner surface, which may be between 20 nm and 2 µm. One of the ends of the pores may be on the outer surface 100 of the porous membrane. The other ends of the pores may be on the inner surface 190. In some embodiments, the ends of the pores on the inner surface 190 may have larger diameters, which may be between 20 nm and 100 µm. With respect to the micro-structure of the substrate, in some embodiments the material 120 that surrounds the pores 140 may be full of combined sintered alumina particles and the outer surface may be not smooth and may be full of spikes or dents 110.

In some embodiments, to make a porous membrane support, the first step is to polish the outer surface of the membrane support. This may be carried out using a polishing medium material 130 to reduce the roughness of the outer surface, as shown in FIG. 1. Because of the roughness that results from the spikes or dents 110 on the surface, a polishing medium material 130 is applied to reduce the surface roughness down to sub-micron variations.

In some embodiments, the polishing medium material may be diamond paste, sandpaper, a polishing pad, grinding tools, or other abrasive media. In some embodiments, a 0.5 µm diamond paste may be used. In some embodiments, an initial polishing sub-step may use a coarser grade of diamond paste and then a final polishing sub-step may use a finer grade of diamond paste. The sample may preferably be thoroughly cleaned and rinsed before applying the finer grade diamond paste. The diamond paste may be applied on a billiard type of cloth and spread evenly, and a lubricant or extender, such as a mixture of a glycol, an alcohol, water, and a detergent, may be used to thin the paste. The initial grade of polisher for the initial coarse polishing sub-step may depend on the conditions of the surface. The final polishing sub-step may, for example, be a microscale-finishing process. For the microscale-finishing process, a grinding or lapping paper may be used prior to the polishing step. The finishing may, for example, start with the use of 10 µm or 6 µm grinding grade paper and step down to the use of 3 µm and 0.5 µm grinding grade paper. For coarser surfaces, the finishing may, for example, start with the use of 20-40 µm grinding grade paper and then gradually step down to the use of sub-0.5 µm grinding grade paper.

In alternate embodiments, similar sub-steps may be employed using other polishing materials, such as sandpaper, polishing pads, grinding tools, or other abrasive media.

In some embodiments, a blocking material, such as a polymer or small molecule, may be applied to the surface of the substrate prior to polishing to fill in the ceramic substrate to prevent damage to the surface from the polishing step, as described in U.S. patent application Ser. No. 17/697,230, which is hereby expressly incorporated herein by reference.

Figure 2:
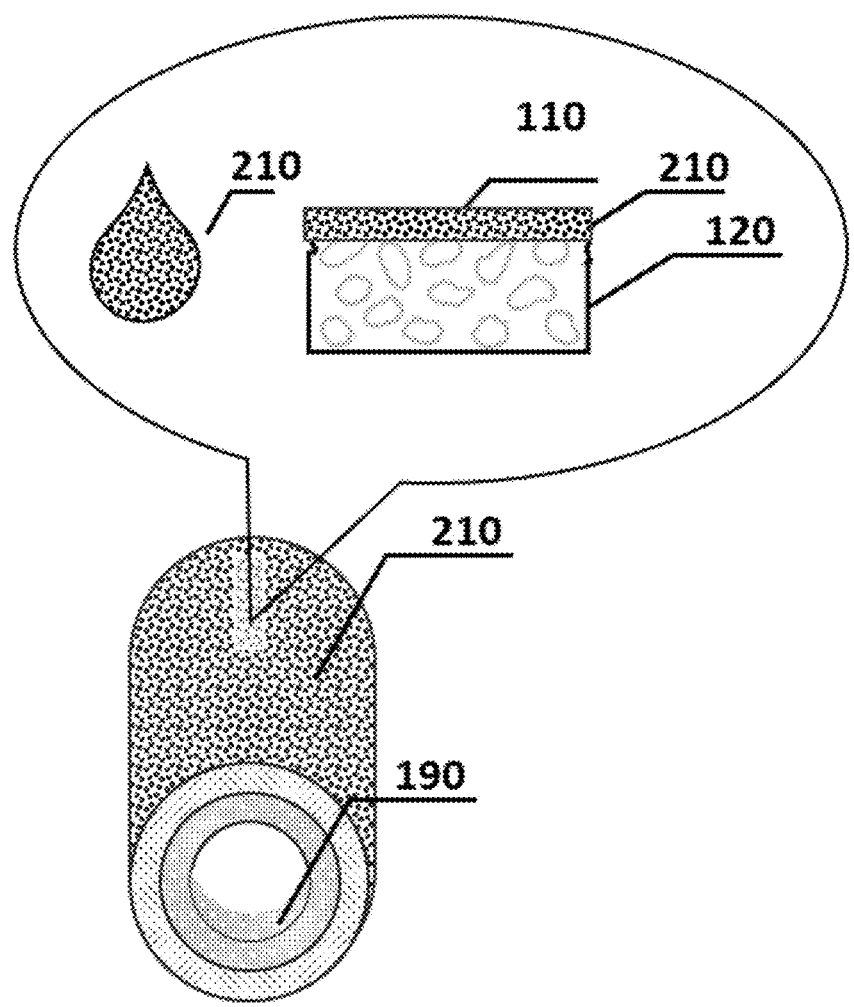
FIG. 2 shows a schematic illustration of a second step for preparing a porous ceramic substrate that involves applying a ceramic nanosphere layer onto a ceramic substrate.

FIG. 2 shows a schematic illustration of a second step for preparing a porous ceramic substrate that involves applying a ceramic nanosphere layer onto a ceramic substrate. A ceramic nanomaterial coating procedure, which may be achieved with a solvent-based coating method such as spin coating, dip-coating, or doctor blade coating, or another suitable coating method, may be used to coat the surface of the substrate with the intermediate ceramic nanosphere layer.

As shown in FIG. 2, after completion of the polishing step, the support surface may be rinsed and then a ceramic nanosphere coating 210 may be applied to the outer surface 100. The coating 210 may preferably be well-bonded to the support so as to form well-aligned porous structures. For example, the coating protocol 220 may be spin coating, dip-coating, Langmuir-Blodgett deposition, solvent evaporation, doctor blade coating, or another suitable method for depositing a thin film coating. In some preferred embodiments, the coating may be about 1 µm in thickness. In other preferred embodiments, the coating may be greater than 1 µm in thickness and up to 100 µm in thickness.

In some embodiments, the polished porous support may be coated with silica nanospheres using a spin-coating process for 10-120 s. The coated surface layer may be between about 1 µm and 100 µm in thickness.

In some other embodiments, the polished surface may be coated with alumina nanoparticles using a doctor-blade coating process to form a thin layer that may be between about 1 µm and 100 µm in thickness.

In some alternate embodiments, the polished surface may be coated with zirconia nanoparticles, titania nanoparticles, or other inert nanoparticles such as nitrides.

Figure 3:
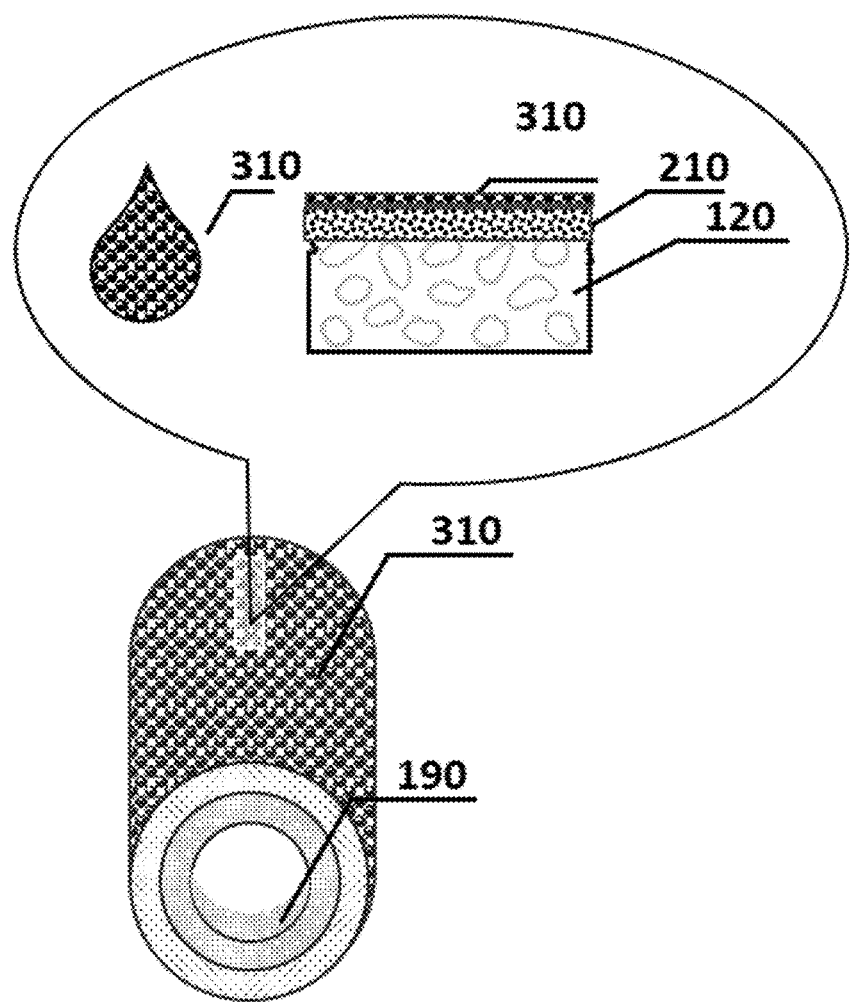
FIG. 3 shows a schematic illustration of a third step for preparing a porous ceramic substrate that involves coating a ceramic nanosphere-coated surface with a silica sol-gel solution, which may include surfactant to form a self-assembled nanoporous structure on the surface.

FIG. 3 shows a schematic illustration of a third step for preparing a porous ceramic substrate. A ceramic nanosphere-coated surface may be used to prepare the porous ceramic substrate, where the porous ceramic substrate may be coated with a silica sol-gel solution to form a self-assembled nanoporous structure on the surface.

As shown in FIG. 3, after the ceramic nanomaterial coating process has been completed, the surface is fully covered with a thin layer of ceramic nanomaterials 210. This thin porous intermediate layer may be coated by a nanoporous silica membrane, which may in some embodiments be formed via EISA (evaporation-induced self-assembly) for fabrication of the membrane, as illustrated in FIG. 3. In some embodiments, a silica sol-gel solution 310 may be applied onto the surface of the substrate.

In some embodiments, the sol-gel solution was prepared according to the following procedure: hexadecyltrimethylammonium bromide (CTAB, 1.2 g) was dissolved in a mixture of ethanol (26.7 g) and aqueous HCl (0.05 M, 2.5 mL), tetraethylorthosilicate (TEOS, 6.5 mL) was added into the solution under stirring, and the solution was stirred for 2 h. After 2 h of stirring, the sol precursor was ready for use. In some embodiments, the specifically designed silica sol-gel precursor solution is the primary material used in the self-assembly process to form porous channels.

In some alternate embodiments, the sol-gel solution was prepared according to the following procedure: a solution of tetraethylorthosilicate (TEOS, 1.04 g), ethanol (1.98 g), aqueous HCl (0.2 M, 1.5 g), and water (0.9 g) was prepared. The solution was sonicated for 1 h in a 60 C oil bath. Separately, Pluronic® P123 (0.29 g) was dissolved in ethanol (5.925 g) under sonication. The TEOS solution was added to the P123 solution to obtain the sol precursor.

In other alternate embodiments, the sol-gel solution was prepared according to the following procedure: Pluronic® P123 (2.0 g) was dissolved in a mixture of ethanol (20 g), water (1.2 g), and aqueous HCl (1 M, 0.8 g). After the P123 was completely dissolved, tetraethylorthosilicate (TEOS, 4.5 mL) was added to the solution under stirring. After continuous stirring for 2 h, the sol precursor was ready for use. The sol precursor was stored in a refrigerator for use within 2 days.

In some embodiments, to make the sol-gel coating more uniformly coated onto the surface, the self-assembly process may use dip-coating or roll-to-roll coating. The pore size of the silica coating layer may be well-controlled, and the thickness of the silica layer may, in some embodiments, be between 2 nm and 10 nm. In some other embodiments, the thickness of the porous silica layer may vary between 10 nm and 1 μm. Depending on the surfactant type and sol-gel concentration, the self-assembled nanochannel structure features may be varied to range from well-aligned vertical channels along the support pores to particle-like random channels.

Figure 4:
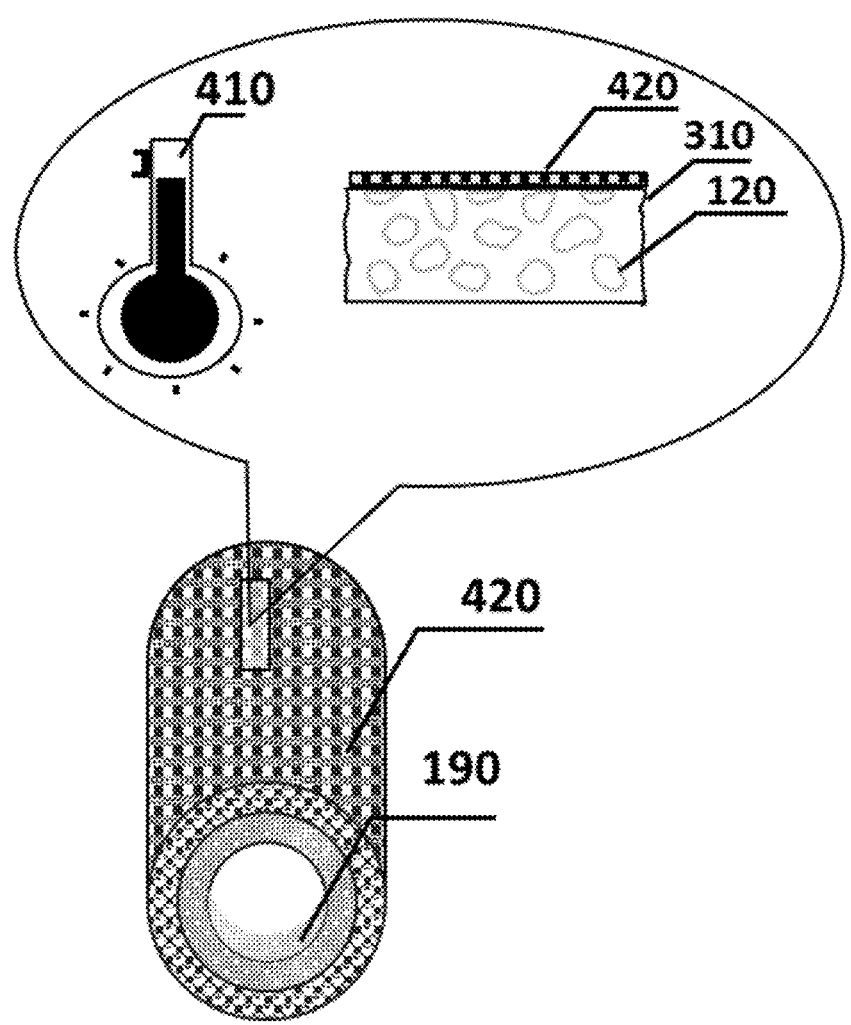
FIG. 4 shows a schematic illustration of a fourth step for preparing a porous ceramic substrate that involves removing surfactant and any blocking material to reveal a support that has multiple silica nanoparticle-sintered nanochannels combined onto the porous substrate.

After this step, the as-made substrate may then be processed to remove the surfactant and form the porous channels onto the substrate surface, as illustrated in FIG. 4.

FIG. 4 shows a schematic illustration of a fourth step for preparing the porous ceramic substrate. In this step, the surfactant and any blocking material that was applied prior to polishing may be removed. The surfactant and any blocking material may be removed, for example, by calcination overnight at greater than 350° C., treating with ultraviolet radiation and ozone at ambient temperature, or by another suitable method.

In this step, a removal protocol 420 may, for example, be use of a furnace heated above 450° C. to remove the surfactant in the sol-gels to form porous channels 410 onto the top surface of the substrate. After this step, the support may have multiple silica nanoparticle sintered nanochannels combined onto the porous substrate. In some embodiments, the final outer nanoporous layer may be about 1 μm in thickness, or may alternatively be less or more than 1 μm in thickness.

In some alternate embodiments, the blocking material may be a photoresist and the removal process may be performed at a lower temperature as is suitable for removal of the photoresist that is used. NMP (1-methyl-2-pyrrolidone) is a generally suitable solvent for removing photoresist layers. The exceptionally low vapor pressure of NMP allows heating to 80° C. to remove even substantially cross-linked photoresist films.

In some embodiments, the nanopore channels may be formed at a high temperature, such as at a temperature of 350-600° C., to remove the surfactant in the sol-gel. In other embodiments, the nanopore channels may be formed at ambient temperature by treatment with ultraviolet radiation and ozone, The previous description of the disclosed embodiments is provided to enable any person skilled in the art to make or use the invention disclosed herein. Although the various inventive aspects are disclosed in the context of certain illustrated embodiments, implementations, and examples, it should be understood by those skilled in the art that the invention extends beyond the specifically disclosed embodiments to other alternative embodiments and/or uses of the invention and obvious modifications and equivalents thereof. In addition, while a number of variations of various inventive aspects have been shown and described in detail, other modifications that are within their scope will be readily apparent to those skilled in the art based upon reviewing this disclosure. It should be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. The generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Similarly, the disclosure is not to be interpreted as reflecting an intent that any claim set forth below requires more features than are expressly recited in that claim. Rather, as the following claims reflect, inventive aspects may reside in a combination of fewer than all features of any single foregoing disclosed embodiment.

Each of the foregoing and various aspects, together with those set forth in the claims and summarized above or otherwise disclosed herein, including the figures, may be combined without limitation to form claims for a device, apparatus, system, method of manufacture, and/or method of use.

All references cited herein are hereby expressly incorporated by reference.

The invention claimed is:

1. A method of fabricating a porous support for membranes that are suitable for capturing gases or liquids, the method comprising the following steps in order:

providing a porous support comprising a first material that has an outer surface and an inner surface;

polishing the outer surface to generate a polished outer surface;

coating a layer of ceramic nanospheres on the polished outer surface;

coating a layer of sol-gel solution onto the ceramic nanosphere layer that is coated on the outer surface of the porous support, the sol-gel solution comprising a surfactant;

removing at least the surfactant from the sol-gel layer on the porous support to generate nanopores, thereby forming a nanoporous layer on top of the porous support;

wherein a size of the nanopores is based, at least in part, on a molecular dimension of the surfactant.

2. The method of claim 1, wherein the outer surface of the porous support is coated with a second material before the polishing step.

3. The method of claim 1, wherein the outer surface of the porous support is coated with a second material after the polishing step to generate a coated outer surface and then the coated outer surface is repolished prior to coating a layer of ceramic nanospheres onto the polished outer surface.

4. The method of claim 1, wherein polishing the coated outer surface comprises:

mechanically polishing the coated outer surface until a roughness of the surface is less than 1 µm; and further polishing the coated outer surface using a polishing paste containing abrasives that are softer than the first material but harder than the second material.

5. The method of claim 1, wherein the porous support comprises at least one material from the group consisting of ceramic materials, metallic materials, polymer materials, or glass materials.

6. The method of claim 5, wherein the porous support comprises porous Vycor glass.

7. The method of claim 1, wherein the ceramic nanospheres are selected from the group consisting of alumina, titania, zirconia, and silica.

8. The method of claim 1, wherein the ceramic nanospheres are coated onto the porous support using a method selected from the group consisting of spin coating, dip-coating, Langmuir-Blodgett deposition, solvent evaporation, and doctor blade coating.

9. The method of claim 1, wherein the porous support is a flat disc or a tube.

10. The method of claim 2, wherein polishing the coated outer surface comprises:

mechanically polishing the coated outer surface until a roughness of the surface is less than 1 µm; and further polishing the coated outer surface using a polishing paste containing abrasives that are softer than the first material but harder than the second material.

11. The method of claim 2, wherein the porous support comprises at least one material from the group consisting of ceramic materials, metallic materials, polymer materials, or glass materials.

12. The method of claim 11, wherein the porous support comprises porous Vycor glass.

13. The method of claim 2, wherein the ceramic nanospheres are selected from the group consisting of alumina, titania, zirconia, and silica.

14. The method of claim 2, wherein the ceramic nanospheres are coated onto the porous support using a method selected from the group consisting of spin coating, dip-coating, Langmuir-Blodgett deposition, solvent evaporation, and doctor blade coating.

15. The method of claim 2, wherein the porous support is a flat disc or a tube.

* * * * *